United States Patent
Okamoto et al.

(10) Patent No.: US 11,284,038 B2
(45) Date of Patent: Mar. 22, 2022

(54) INFORMATION PROCESSING APPARATUS, INFORMATION PROCESSING METHOD, AND COMPUTER-READABLE RECORDING MEDIUM RECORDING INFORMATION PROCESSING PROGRAM

(71) Applicant: FUJITSU LIMITED, Kawasaki (JP)

(72) Inventors: Hiroaki Okamoto, Atsugi (JP); Tsuyoshi Nagato, Isehara (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 81 days.

(21) Appl. No.: 17/012,101

(22) Filed: Sep. 4, 2020

(65) Prior Publication Data
US 2021/0006748 A1    Jan. 7, 2021

Related U.S. Application Data

(63) Continuation of application No. PCT/JP2018/008929, filed on Mar. 8, 2018.

(51) Int. Cl.
    *H04N 7/01* (2006.01)
    *G06N 20/00* (2019.01)
    *G06N 3/12* (2006.01)

(52) U.S. Cl.
    CPC ............ *H04N 7/0125* (2013.01); *G06N 3/12* (2013.01); *G06N 20/00* (2019.01); *H04N 7/0145* (2013.01)

(58) Field of Classification Search
    CPC ...... H04N 7/0125; H04N 7/0145; G06N 3/12; G06N 20/00; G06N 20/10; G06N 3/126; G06F 8/30; G06T 7/0004
    See application file for complete search history.

(56) References Cited

U.S. PATENT DOCUMENTS

2008/0040302 A1* 2/2008 Perrizo ............... G06K 9/6276
                                                          706/20
2018/0225125 A1    8/2018 Okamoto et al.

FOREIGN PATENT DOCUMENTS

JP    H07-295953 A    11/1995
JP    2011-34459 A     2/2011
(Continued)

OTHER PUBLICATIONS

Akira Suzuki et al., "Feature Selection by Genetic Algorithm that Adopts the Principle of Margin-Maximization and its Application to Character Recognition", The Journal of the Institute of Image Electronics Engineers of Japan, vol. 41, No. 2, pp. 131-139, Mar. 30, 2012 (Total 9 pages) (Cited in ISR).

(Continued)

*Primary Examiner* — Michael E Teitelbaum
(74) *Attorney, Agent, or Firm* — Fujitsu Patent Center

(57) ABSTRACT

An information processing apparatus includes: a memory; and a processor configured to: execute genetic processing on class classification programs of a set of class classification programs; acquire a distance between each learning data and an identification boundary regarding evaluation identifiers created by using first class learning data belonging to a first class and second class learning data belonging to a second class according to the class classification program; calculate a statistic amount of a distribution of a distance to the identification boundary for each of the first class learning data and the second class learning data; define a fitness calculation equation based on the statistic amounts of the first class learning data and the second class learning data; calculate the fitness of the class classification program; and determine whether or not to replace the class classification program with one of class classification programs of the set depending on the fitness.

11 Claims, 15 Drawing Sheets

(56) References Cited

FOREIGN PATENT DOCUMENTS

| JP | 2013-125524 A | 6/2013 |
| WO | 2017/006875 A1 | 1/2017 |
| WO | 2017/068675 A1 | 4/2017 |

OTHER PUBLICATIONS

Stefan Lessmann et al., "Genetic Algorithms for Support Vector Machine Model Selection", The 2006 IEEE International Joint Conference on Neural Network Proceedings, pp. 3063-3069, Jul. 16-21, 2006 (retrieved on May 14, 2018), Internet <https://ieeexplore.ieee.org/stamp/stamp.jsp?tp=&arnumber=1716515> (Total 7 pages) (Cited in ISR).

International Search Report and Written Opinion of the International Searching Authority (Form PCT/ISA/210, 220, and 237), mailed in connection with PCT/JP2018/008929 and dated May 29, 2018 (Total 10 pages).

\* cited by examiner

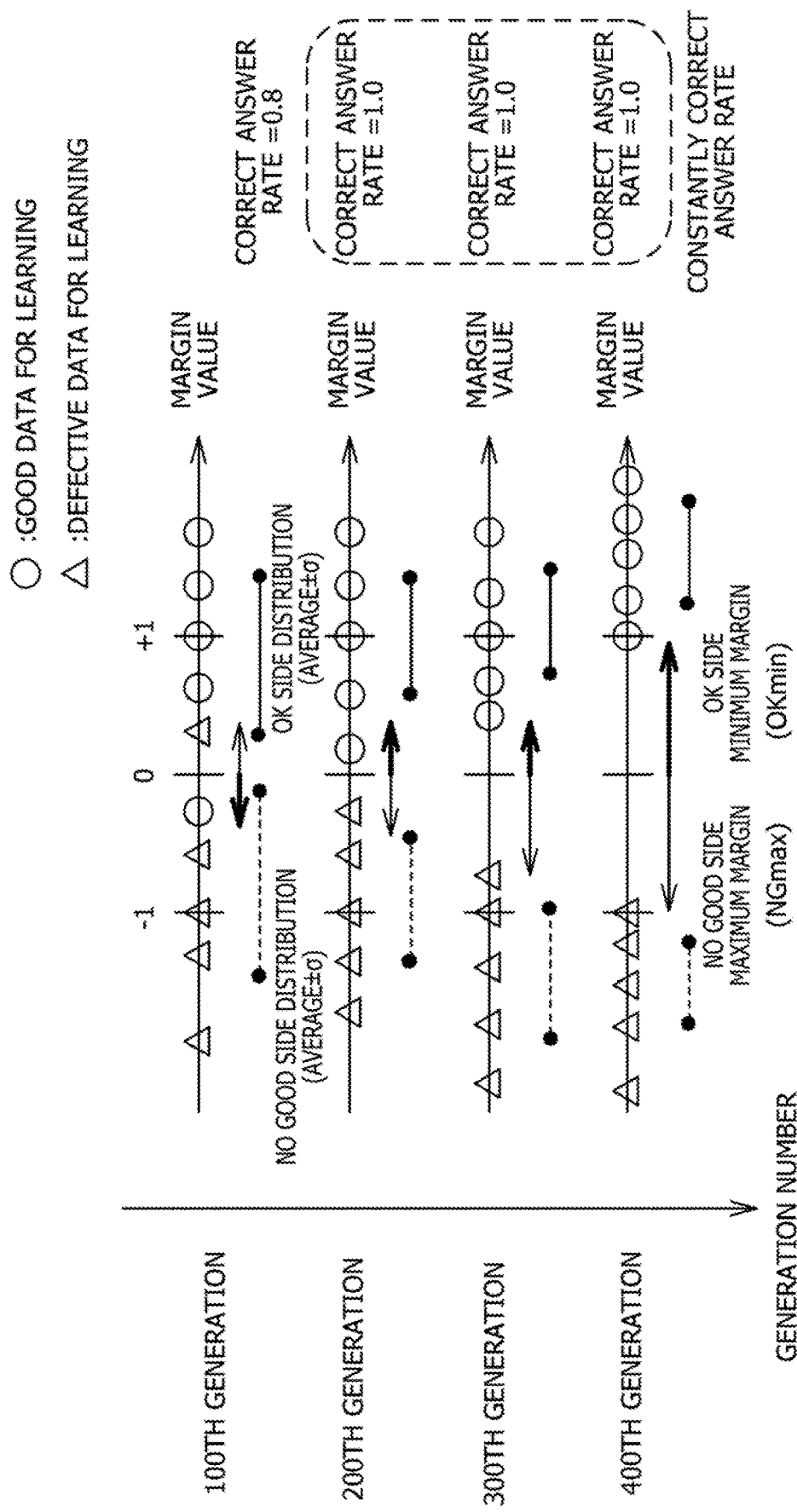

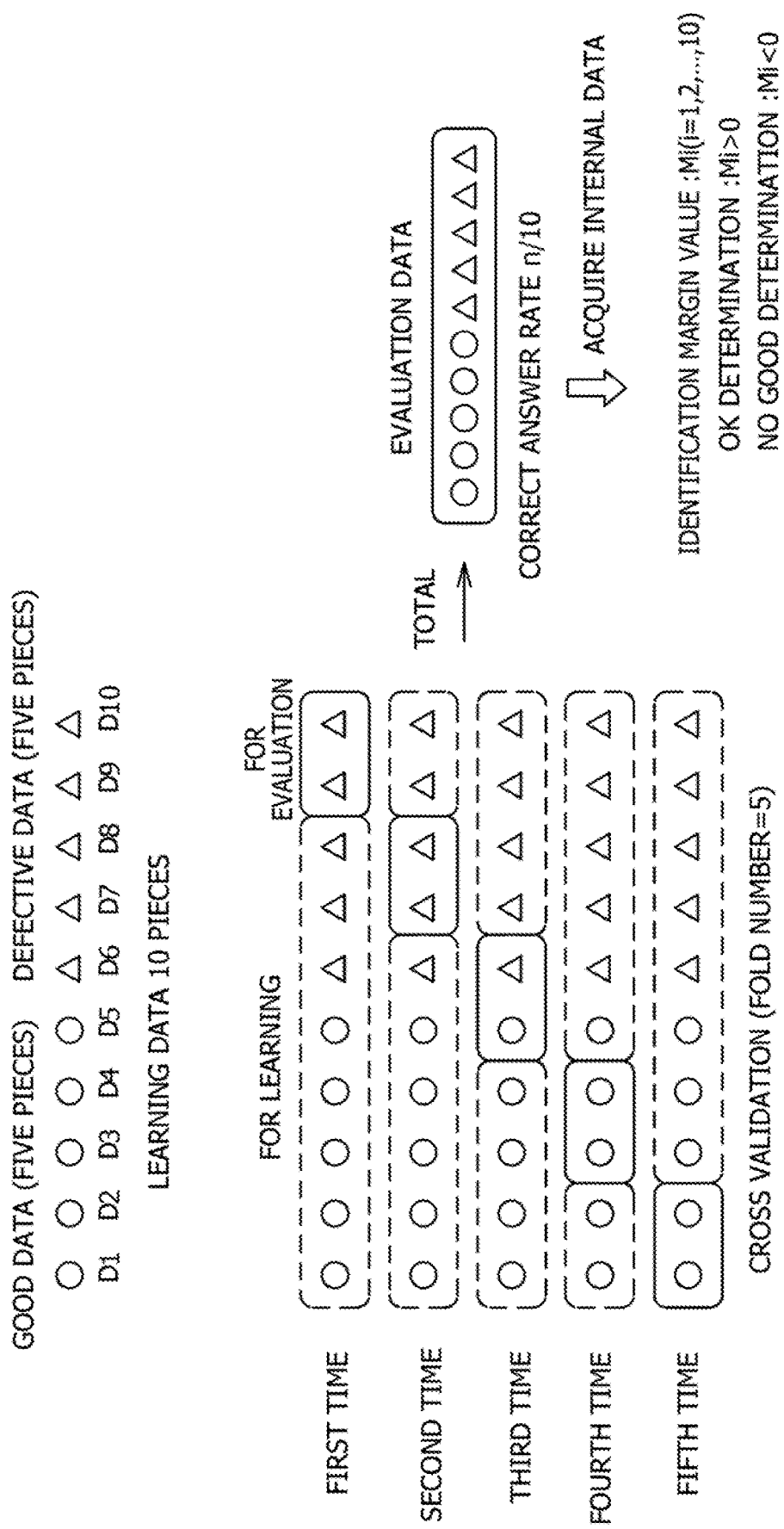

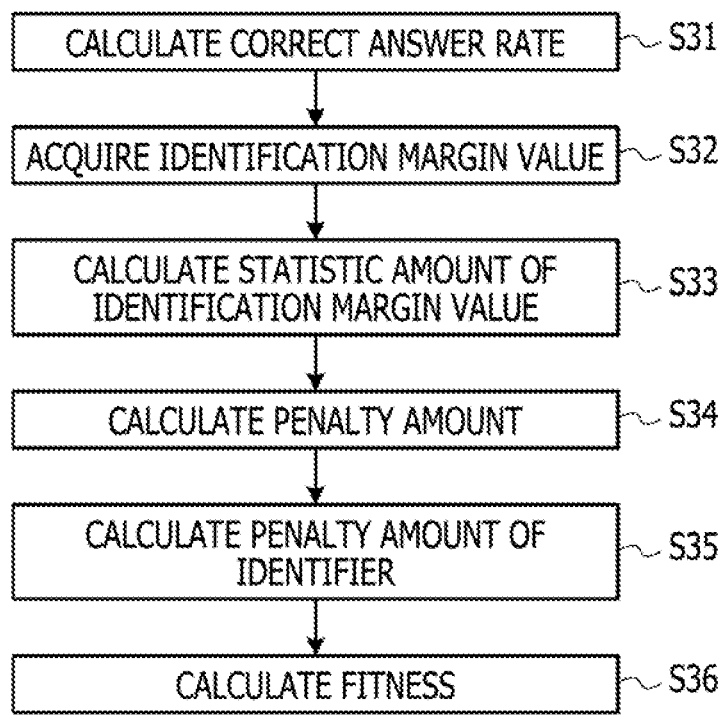

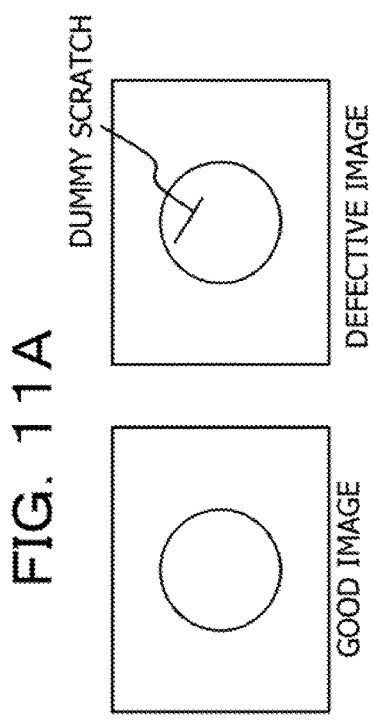
FIG. 11A
FIG. 11B
| | GOOD IMAGE | DEFECTIVE IMAGE | TOTAL |
|---|---|---|---|
| LEARNING IMAGE | 20 | 20 | 40 |
| DETERMINATION IMAGE | 80 | 80 | 160 |
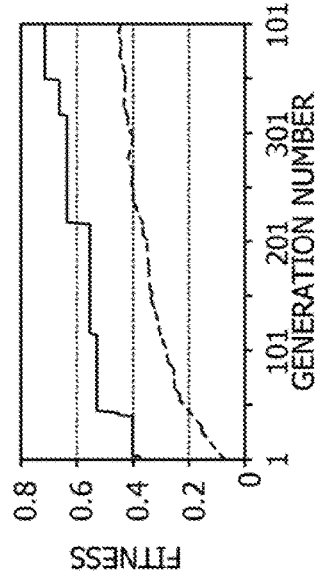
FIG. 11C
| GENERATION NUMBER | OK DETERMINATION | OVER DETECTION | MISSED | NO GOOD DETECTION | CORRECT ANSWER RATE |
|---|---|---|---|---|---|
| G031 | 74 | 6 | 21 | 59 | 0.831 |
| G162 | 53 | 27 | 10 | 70 | 0.768 |
| G210 | 66 | 14 | 12 | 68 | 0.837 |
| G318 | 71 | 9 | 13 | 67 | 0.862 |
| AVERAGE | | | | | 0.825 |
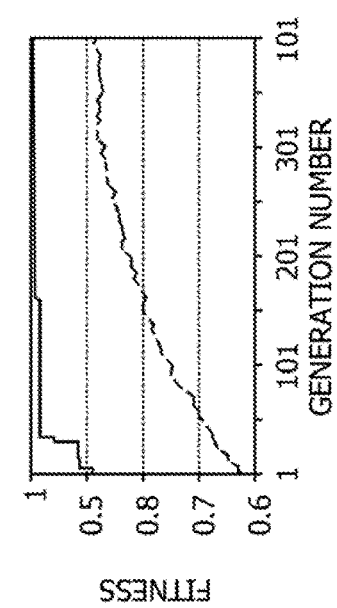
FIG. 11D
| GENERATION NUMBER | OK DETERMINATION | OVER DETECTION | MISSED | NO GOOD DETECTION | CORRECT ANSWER RATE |
|---|---|---|---|---|---|
| G044 | 68 | 12 | 13 | 67 | 0.843 |
| G113 | 68 | 12 | 13 | 67 | 0.843 |
| G215 | 71 | 9 | 11 | 69 | 0.875 |
| G314 | 71 | 9 | 11 | 69 | 0.875 |
| AVERAGE | | | | | 0.859 |

INFORMATION PROCESSING APPARATUS, INFORMATION PROCESSING METHOD, AND COMPUTER-READABLE RECORDING MEDIUM RECORDING INFORMATION PROCESSING PROGRAM

CROSS-REFERENCE TO RELATED APPLICATION

This application is a continuation application of International Application PCT/JP2018/008929 filed on Mar. 8, 2018 and designated the U.S., the entire contents of which are incorporated herein by reference.

FIELD

The embodiments discussed herein are related to an information processing apparatus, an information processing method, and an information processing program.

BACKGROUND

A technology for obtaining an optimum solution by genetic programming is disclosed. A technology for automatically generating a class classification program that performs quality classification on a quality determination target by such genetic programming has been desired.

International Publication Pamphlet No. WO 2017/06875 is disclosed as related art.

SUMMARY

According to an aspect of the embodiments, an information processing apparatus includes: a memory; and a processor coupled to the memory and configured to: execute genetic processing on at least two class classification programs selected from a set of a plurality of class classification programs; acquire a distance between each piece of learning data and an identification boundary regarding a plurality of evaluation identifiers created by using one or more pieces of first class learning data belonging to a first class and one or more pieces of second class learning data belonging to a second class according to the class classification program on which the genetic processing has been executed; calculate a statistic amount of a distribution of a distance to the identification boundary for each of the first class learning data and the second class learning data; define a fitness calculation equation in which a fitness is larger as separability between the first class and the second class increases on a basis of the statistic amount of the first class learning data and the statistic amount of the second class learning data; calculate the fitness of the class classification program on which the genetic processing has been executed; and determine whether or not to replace the class classification program on which the genetic processing has been executed with any one of class classification programs of the set depending on the fitness.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates a schematic diagram in which a single best individual in each learning generation is focused and an identification margin value of each piece of learning data at the time of K-fold cross validation of the best individual is plotted on a one-dimensional axis;

FIG. 8 is a diagram illustrating an outline of learning at the time of K-fold cross validation;

FIG. 10 is a diagram illustrating a flowchart indicating fitness calculation processing;

FIGS. 11A to 11D are diagrams indicating results of verification according to the first embodiment;

DESCRIPTION OF EMBODIMENTS

For example, when an attempt is made to automatically generate the class classification program on the basis of a correct answer rate by the genetic programming, a class classification program with high general versatility is not necessarily generated.

In one aspect, an information processing apparatus, an information processing method, and an information processing program that can generate a class classification program with high general versatility may be provided.

Hereinafter, embodiments will be described with reference to the drawings.

First Embodiment

Figure 1:
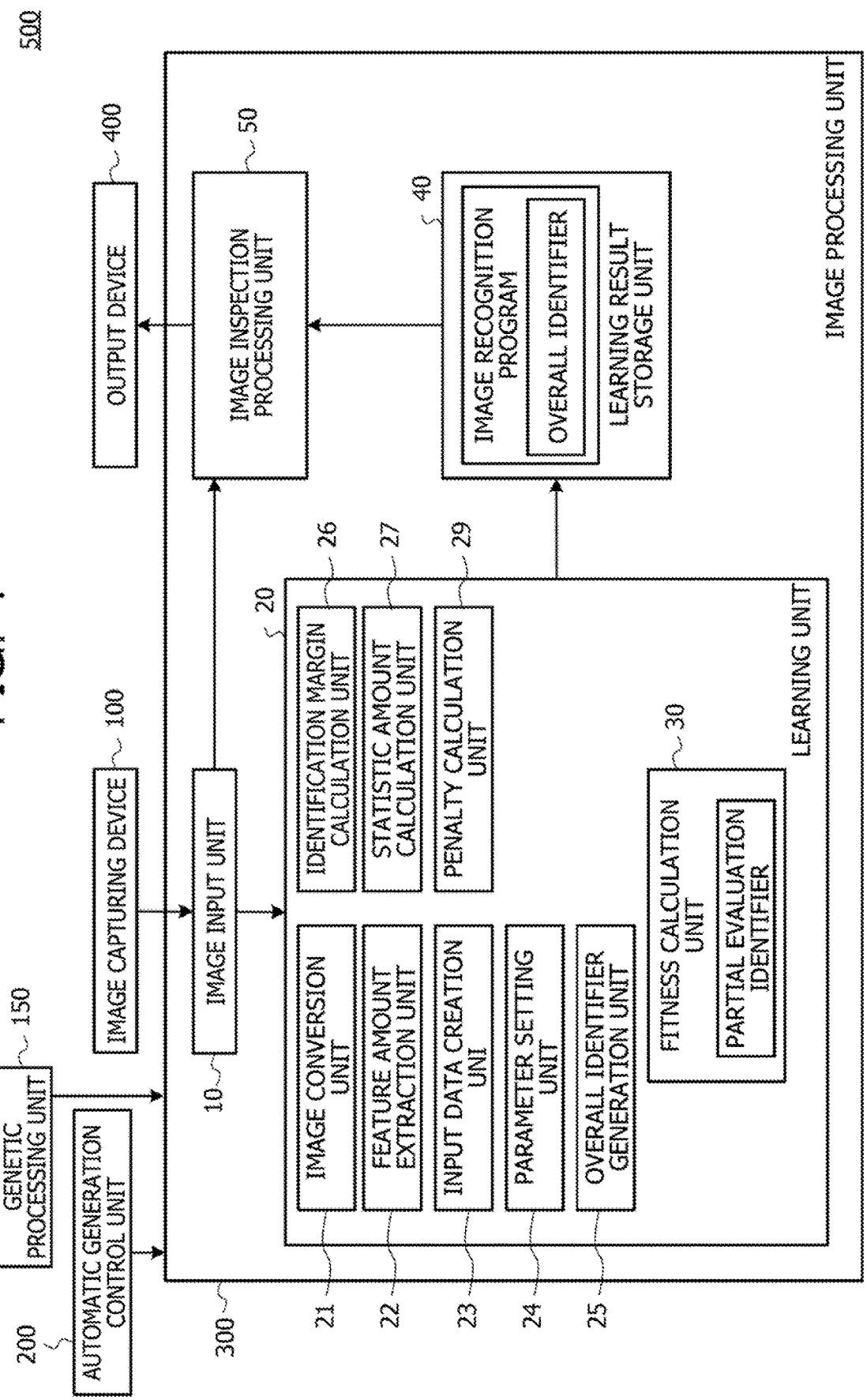
FIG. 1 is a block diagram illustrating an entire configuration of an information processing apparatus according to a first embodiment.

FIG. 1 is a block diagram illustrating an entire configuration of an information processing apparatus 500 according to a first embodiment. As illustrated in FIG. 1, the information processing apparatus 500 includes an image capturing device 100, a genetic processing unit 150, an automatic generation control unit 200, an image processing unit 300, an output device 400, or the like. The image processing unit 300 functions as an image input unit 10, a learning unit 20, a learning result storage unit 40, an image inspection processing unit 50, or the like. The learning unit 20 functions as an image conversion unit 21, a feature amount extraction unit 22, an input data creation unit 23, a parameter setting unit 24, an overall identifier generation unit 25, an identification margin calculation unit 26, a statistic amount calculation unit 27, a penalty calculation unit 29, a fitness calculation unit 30, or the like.

The image capturing device 100 is a capturing device such as a camera. The image capturing device 100 captures an image of an object. The object is a target of class classification (quality determination in a case of two-class classification into good product/defective product). The image capturing device 100 acquires a learning image, a quality determination image, or the like by capturing the image of the object. The learning image is an image used to generate an identifier for determining the quality. The quality determination image is an image used to determine the quality.

The output device 400 is a display device or the like used to output the determination result. The output device 400 displays a determination result on a screen or the like as an inspection result of the image inspection processing unit 50.

The genetic processing unit 150 and the automatic generation control unit 200 automatically generate a class classification program by using Genetic Programming (GP). The class classification program includes a plurality of element filters that individually executes image processing. By combining the plurality of element filters in a form of a tree structure and executing a series of filter processing, it is possible to realize target class classification. By executing genetic processing such as crossover or mutation on a group of tree-structure filter strings, a class classification program having a high fitness is generated. The fitness is an index indicating how good an output result of the tree-structure filter string is that is automatically generated relative to the target class classification result. In a case where a tree-structure filter having a fitness equal to or more than a predetermined threshold is obtained, it is assumed that learning be completed. The tree-structure filter string obtained in this case is a class classification program that executes the target class classification.

Figure 2:
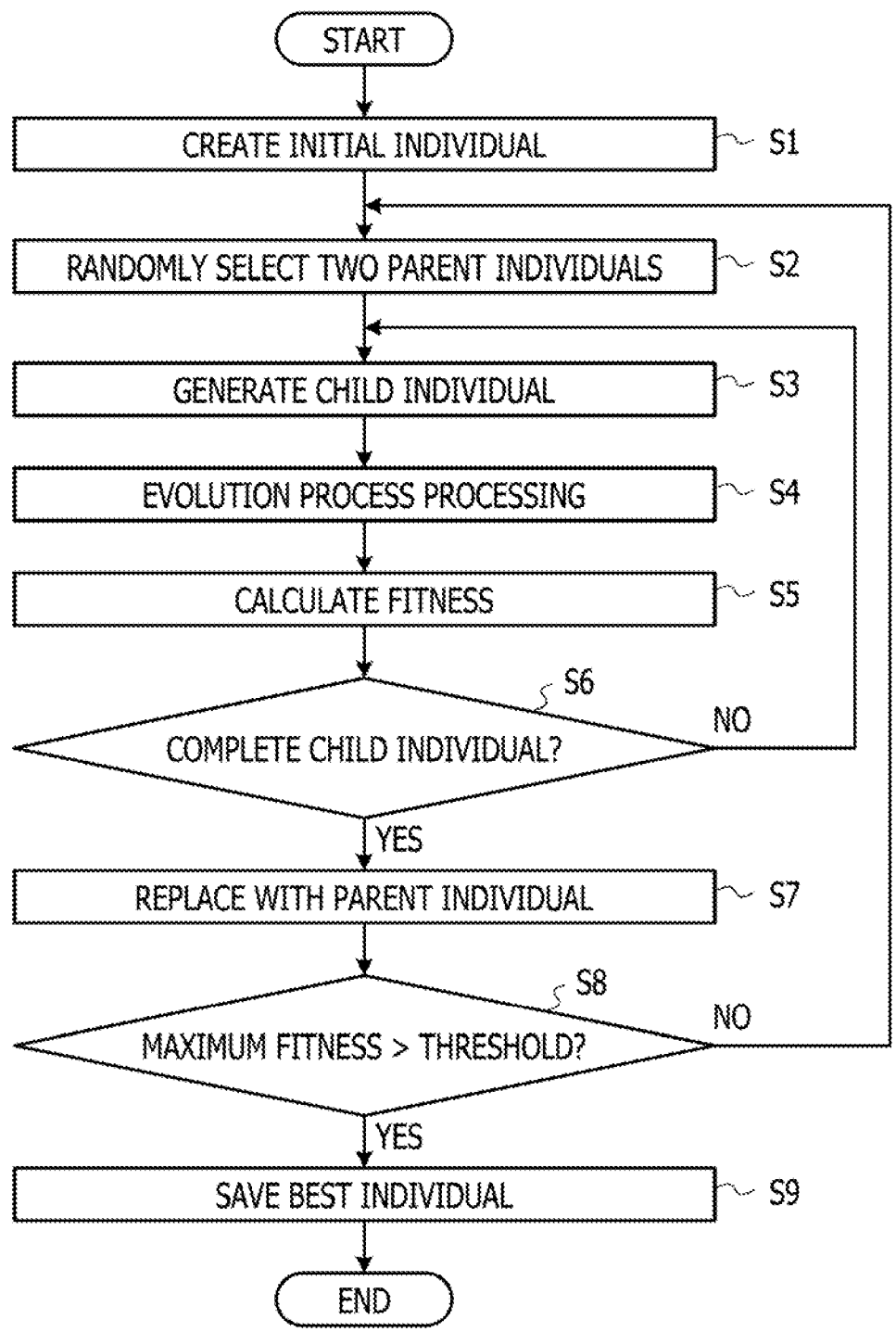
FIG. 2 is a diagram illustrating a flowchart executed when the information processing apparatus automatically generates a class classification program.
Figure 3:
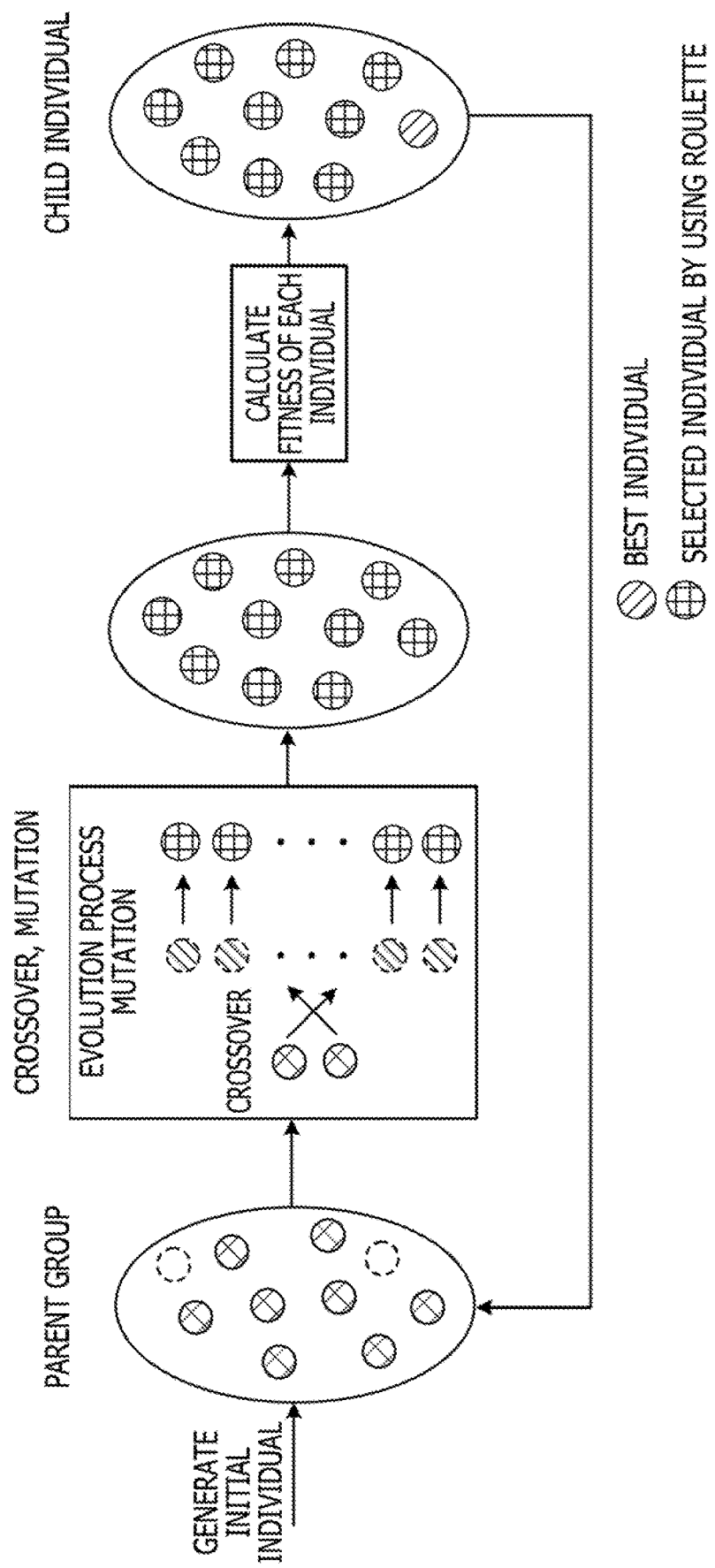
FIG. 3 is a diagram for explaining an outline of genetic programming.

FIG. 2 is a diagram illustrating a flowchart executed when the information processing apparatus 500 automatically generates the class classification program. FIG. 3 is a diagram for explaining an outline of the genetic programming. Hereinafter, processing for automatically generating the class classification program by the information processing apparatus 500 will be described with reference to FIGS. 2 and 3.

First, the genetic processing unit 150 creates an initial individual (step S1). In FIG. 3, each of a circular "individual" represents a class classification program having a tree-structure filter string. For example, a single individual is a single class classification program and has a tree-structure filter string. By generating the plurality of initial individuals, it is possible to generate a parent population (set).

Next, the genetic processing unit 150 randomly selects and extracts two individuals from the parent population (step S2). Next, the genetic processing unit 150 executes the genetic processing on the two individuals extracted in step S2 so as to generate a child individual (step S3). The genetic processing is processing for executing the genetic processing such as the crossover or the mutation relative to the tree-structure filter string. In the present embodiment, according to the genetic processing, image conversion processing by the image conversion unit 21, feature amount extraction processing by the feature amount extraction unit 22, and parameter setting processing by the parameter setting unit 24 are generated. Next, the genetic processing unit 150 makes the learning unit 20 execute evolution process processing on the child individual generated in step S3 (step S4). Next, the genetic processing unit 150 makes the learning unit 20 calculate a fitness regarding the child individual (step S5).

Next, the genetic processing unit 150 determines whether or not all the child individuals have been completed (step S6). For example, the automatic generation control unit 200 determines whether or not generation of all the child individuals from the two individuals extracted in step S2 has been completed. In a case where it is determined as "No" in step S6, the procedure is executed again from step S3. In a case where it is determined as "Yes" in step S6, the automatic generation control unit 200 determines a single individual depending on the fitness. For example, the automatic generation control unit 200 determines a single individual having the highest fitness as a best individual and determines a single individual by randomly selecting the individual by using a roulette. The automatic generation control unit 200 replaces the determined two individuals with the two individuals in the parent population (step S7).

Next, the automatic generation control unit 200 determines whether or not the maximum value of the fitness of each individual, in the parent population, exceeds the threshold (step S8). In a case where it is determined as "No" in step S8, the procedure is executed again from step S2. In a case where it is determined as "Yes" in step S8, the automatic generation control unit 200 saves the individual of which the fitness exceeds the threshold as the best individual (step S9). For example, the automatic generation control unit 200 makes the learning result storage unit 40 store the best individual (class classification program). In the present embodiment, the automatic generation control unit 200 makes the learning result storage unit 40 store an identifier in a case where the best individual is generated. As a result, a desired class classification program can be automatically generated.

Figure 4:
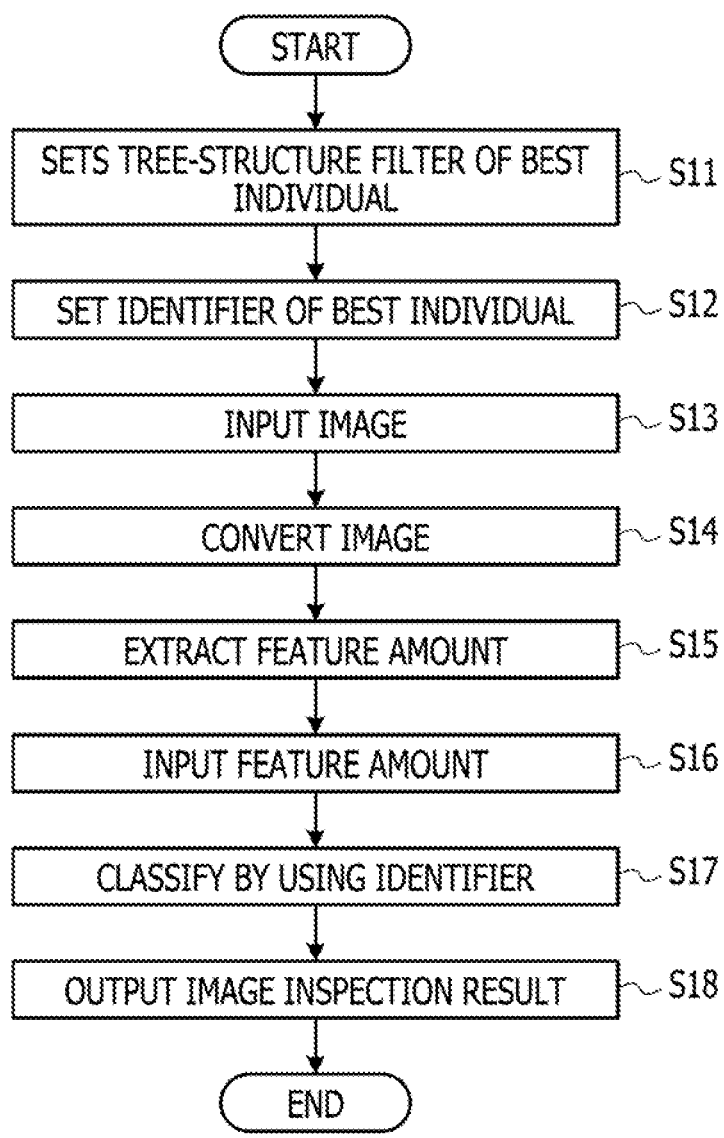
FIG. 4 is a diagram illustrating a flowchart executed when inspection processing using a class classification program for a best individual is executed.

FIG. 4 is a diagram illustrating a flowchart executed when inspection processing using a class classification program for a best individual is executed. The inspection processing is processing for determining quality of an object of which the quality needs to be actually determined by using the best class classification program obtained as a result of learning. As illustrated in FIG. 4, the image inspection processing unit 50 sets a tree-structure filter of the best individual stored in the learning result storage unit 40 (step S11). For example, the image inspection processing unit 50 sets image conversion processing and feature amount extraction processing of the best class classification program. Next, the image inspection processing unit 50 sets an identifier of the best individual stored in the learning result storage unit 40 (step S12).

Next, the image inspection processing unit 50 receives a quality determination image from the image input unit 10 (step S13). Next, the image inspection processing unit 50 executes the image conversion processing on the quality determination image received in step S13 (step S14). Next, the image inspection processing unit 50 executes the feature amount extraction processing on the converted quality determination image (step S15). Next, the image inspection processing unit 50 inputs the feature amount extracted in step S15 to the identifier as input data (step S16). Next, the image inspection processing unit 50 classifies quality of the input data by using the identifier (step S17). Next, the output device 400 outputs a classification result of the image inspection processing unit 50 (step S18). According to the above processing, it is possible to classify the quality of the quality determination image by using the class classification program regarding the best individual.

Hereinafter, details of the evolution process processing in step S4 and details of the fitness calculation processing in step S5 will be described.

Figure 5:
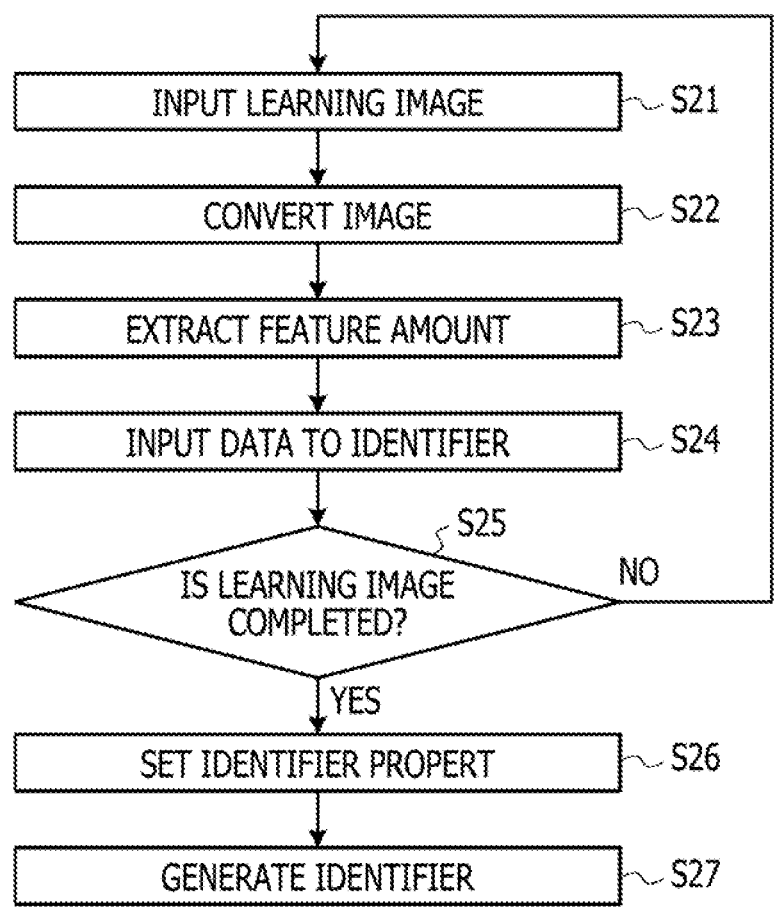
FIG. 5 is a flowchart illustrating details of evolution process processing in step S4.
Figure 6:
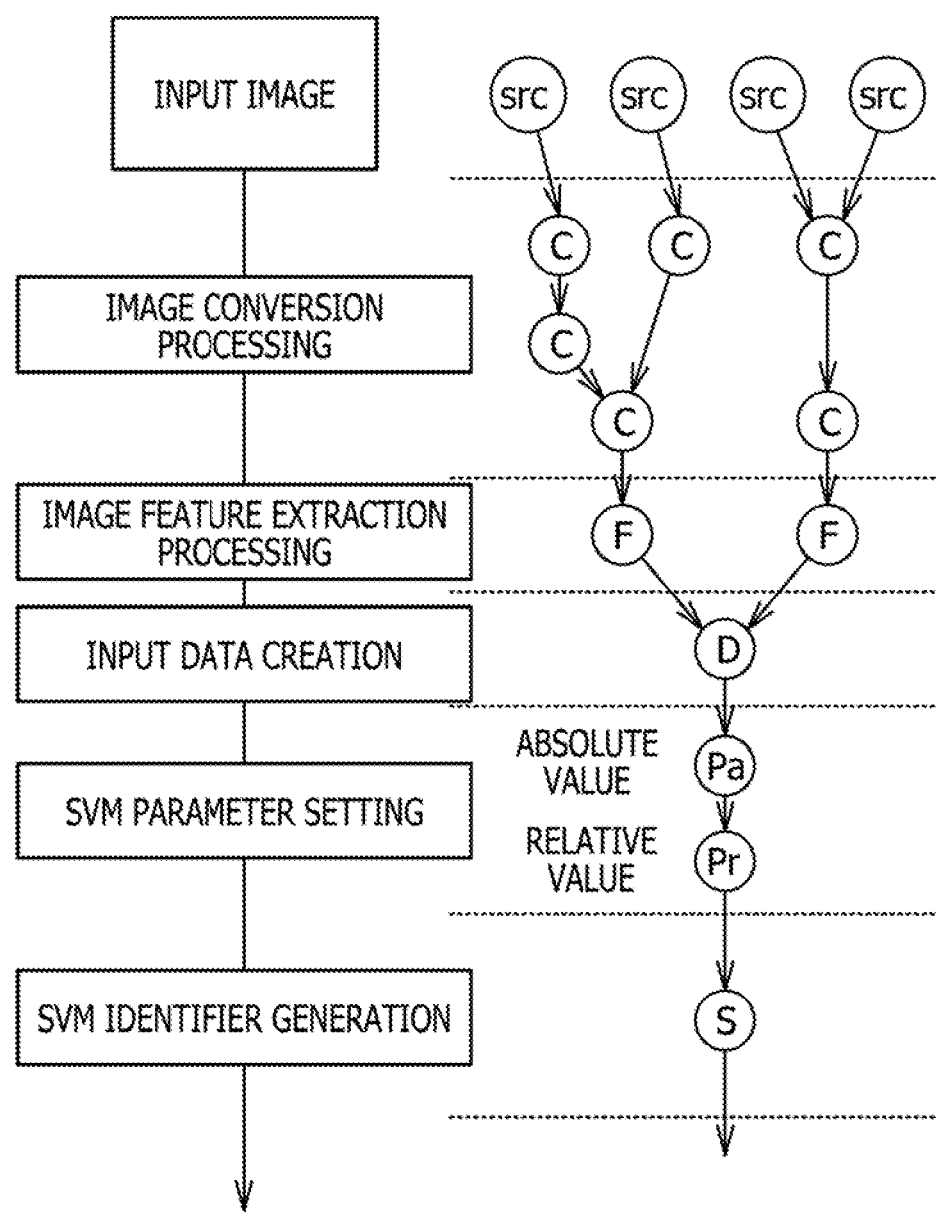
FIG. 6 is a diagram illustrating an outline of the evolution process processing.

FIG. 5 is a flowchart illustrating the details of the evolution process processing in step S4. FIG. 6 is a diagram illustrating an outline of the evolution process processing. The details of the evolution process processing in step S4 will be described with reference to FIGS. 5 and 6. Note that the evolution process processing is fixed for each individual. Therefore, if the individual is different, in the evolution process processing, processing content of the image conversion unit 21, the feature amount extraction unit 22, the input data creation unit 23, the parameter setting unit 24, and the overall identifier generation unit 25 is different.

As illustrated in FIGS. 5 and 6, the image input unit 10 inputs an unprocessed learning image from among a plurality of learning images received from the image capturing device 100 to the learning unit 20 (step S21). A plurality of learning images src illustrated in FIG. 6 is the same learning image.

Next, the image conversion unit 21 executes the image conversion processing on the learning image src (step S22). A plurality of image conversion filters C illustrated in FIG. 6 indicates filters that respectively convert different images. In the example in FIG. 6, a case where the image conversion processing is executed on the single learning image src by using the plurality of different image conversion filters C, a case where the image conversion processing is executed on the two learning images src by using the single image conversion filter C, or the like are included.

Next, the feature amount extraction unit 22 extracts the feature amount from the converted learning image (step S23). A plurality of image feature extraction processing F illustrated in FIG. 6 may be different image extraction filters or the same image extraction filters. In the example in FIG. 6, a tree structure formed by the plurality of image conversion filters C and the plurality of image feature extraction processing F corresponds to the tree-structure filter string.

Next, the input data creation unit 23 inputs the extracted feature amount to the overall identifier generation unit 25 as input data D (step S24). For example, the input data D is a feature vector obtained by vectorizing a plurality of feature amounts. The image input unit 10 determines whether or not the learning image is completed (step S25). For example, the image input unit 10 determines whether or not an unprocessed learning image remains. In a case where it is determined as "No" in step S25, the procedure is executed again from step S21. In this case, in step S21, a next unprocessed learning image is input to the learning unit 20.

In a case where it is determined as "Yes" in step S25, the parameter setting unit 24 sets an identifier property by setting a parameter of the identifier (step S26). In the present embodiment, an SVM identifier is used as the identifier. The SVM is a machine-learning identifier and indicates a Support Vector Machine. The parameter setting unit 24, for example, sets an absolute value filter Pa that sets an absolute value and sets a relative value filter Pr that performs relative adjustment.

Next, the overall identifier generation unit 25 generates the identifier according to the identifier property set by the parameter setting unit 24 by using all the pieces of input data input from the input data creation unit 23 (step S27). For example, the overall identifier generation unit 25 generates the identifier by setting four types of SVM kernels (LINEAR, POLYNOMIAL, RBF, and SIGMOID). By executing the processing in steps S21 to S27 described above, the evolution process processing is completed.

Subsequently, the details of the fitness calculation processing in step S5 will be described. First, a definition of the fitness will be described. For example, to define the fitness, it is considered to use a correct answer rate based on the learning image. The correct answer rate includes a correct answer rate of the learning image obtained by the identifier generated by using all the learning images, a correct answer rate of K-fold cross validation relative to the learning image, or the like. The K-fold cross validation is to divide the learning image into K groups and repeats the cross validation K times so as to assume the sum (average of correct answer rates) as the correct answer rate. The number of divisions K is referred to as a fold number. In the present embodiment, the correct answer rate of the K-fold cross validation is examined as an example. Note that, hereinafter, for simple description, the K-fold cross validation is simply described as cross validation.

Normally, by using a fitness definition equation in which, the higher the correct answer rate of the cross validation is, the higher the fitness is, it is possible to generate a learning result (class classification program) having general versatility. However, by using the learning images of which the number is limited, there is a possibility that a solution having high general versatility is not constantly obtained. For example, in a case where the number of learning images is small, a difference in the correct answer rates hardly occurs. Therefore, there is a case where the learning result having insufficient general versatility is obtained. For example, in a case where the number of learning images is 10, the correct answer rate can be obtained only at 10% intervals, and the difference in the fitness hardly occurs. Therefore, there is a possibility that an individual having low general versatility is selected from among the learning results having the same correct answer rate, and it is not possible to necessarily obtain sufficient classification accuracy.

Therefore, in the present embodiment, in order to generate the class classification program having high general versatility, not only the correct answer rate but also a distance from an identification boundary of each learning image obtained at the time of the cross validation is used. In the present embodiment, as an example, a margin value (SVM identification margin value) from the identification boundary of each learning image is used as the distance. Usually, in the class classification using the SVM, an evaluation score (identification margin value) that is internally obtained is used, and it is determined to make classification into which one of two classes depending on whether the margin value is larger or smaller than a classification reference value.

Hereinafter, in the quality determination, a case will be described where, in a case where the classification reference value is zero and the margin value is positive, it is determined as good (OK), and in a case where the margin value is negative, it is determined as defective (no good). In the present embodiment, a statistic amount of the identification margin value is used, and the fitness is defined so that the fitness becomes higher as a difference (separability) between a distribution on the OK data side and a distribution on the no good data side is larger.

FIG. 7 illustrates a schematic diagram in which a single best individual in each learning generation is focused and an identification margin value of each learning image at the time of K-fold cross validation of the best individual is plotted on a one-dimensional axis. In the example in FIG. 7, it is assumed that the number of learning images be 10. Furthermore, among the 10 learning images, it is assumed that the number of pieces of good data for learning (OK data) be five and the number of pieces of defective data for learning (no good data) be five.

When an identification margin value of the good data for learning is positive, it is determined that the object is a good product, and the determination result indicates a correct answer. When the identification margin value of the good data for learning is negative, it is determined that the object is a defective product, and the determination result indicates an incorrect answer. When the correct answer rate of each generation is calculated in this way, for example, a correct answer rate of the 100th generation=0.8, and a correct answer rate of the 200th generation and subsequent generation=constantly 1.0. Therefore, in a case where only the correct answer rate is used as the reference for learning, learning is not proceeded any more.

On the other hand, in order to obtain the learning result with high general versatility, as illustrated in FIG. 7, as the generation advances, it is desirable that the distributions on the OK side and the no good side of the identification margin value gradually expand (separated). When both distributions are separated in the learning image, in a case where unknown data is determined, it is possible to correctly make determination with room. Originally, the SVM is a method for obtaining the learning result in which the identification margin value is the largest. However, at the time of the cross validation during learning, it is not guaranteed that the identification margin value becomes maximum. In the present embodiment, by proceeding the learning in a direction of expanding the distribution of the identification margin value of each learning image at the time of the cross validation, the learning result with high general versatility is obtained. The basic definition of the fitness is expressed as the following equation (1).

$$\text{Fitness=correct answer rate+cross validation identification margin separability} \quad (1)$$

Here, an outline of learning at the time of cross validation and a method for calculating the identification margin value will be described. FIG. 8 is a diagram illustrating an outline of learning at the time of K-fold cross validation. As illustrated in FIG. 8, it is assumed that 10 learning images in total including five pieces of good data for learning and five pieces of defective data for learning be used. In a case where the cross validation is performed on the 10 learning images with the fold number=5, two pieces of data for determination evaluation are secured as illustrated in FIG. 8, and a partial evaluation identifier is generated by using remaining eight pieces of data. The quality of the two pieces of secured data is determined by using the generated partial evaluation identifier. By repeating this procedure at a plurality of times (five times), a plurality of (five) partial evaluation identifiers is generated, and the quality of all the 10 learning images is determined, and it is possible to obtain the correct answer rate. The high correct answer rate of the cross validation indicates that there is a high possibility that the tree-structure element filter generated by the genetic programming effectively acts on unknown data. On the other hand, regarding the identifier generated by using all the learning images, by executing processing on the entire learning image, it is possible to similarly obtain the correct answer rate and the identification margin value of each piece of data. The identifier in this case can be assumed as an overall evaluation identifier. When the statistic amount of the identification margin value is obtained, a margin value of the overall evaluation identifier may be included and calculated. A combination of the overall evaluation identifier and the above plurality of partial evaluation identifiers is referred to as an evaluation identifier.

Figure 9A:
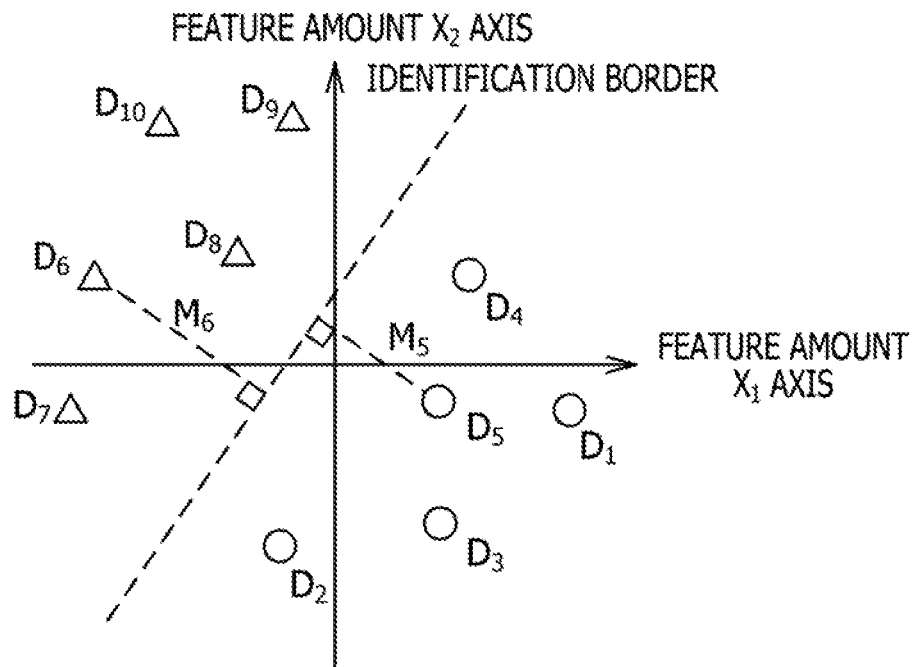
FIGS. 9A and 9B are diagrams illustrating a process for obtaining an identification margin value of each piece of data.
Figure 9B:
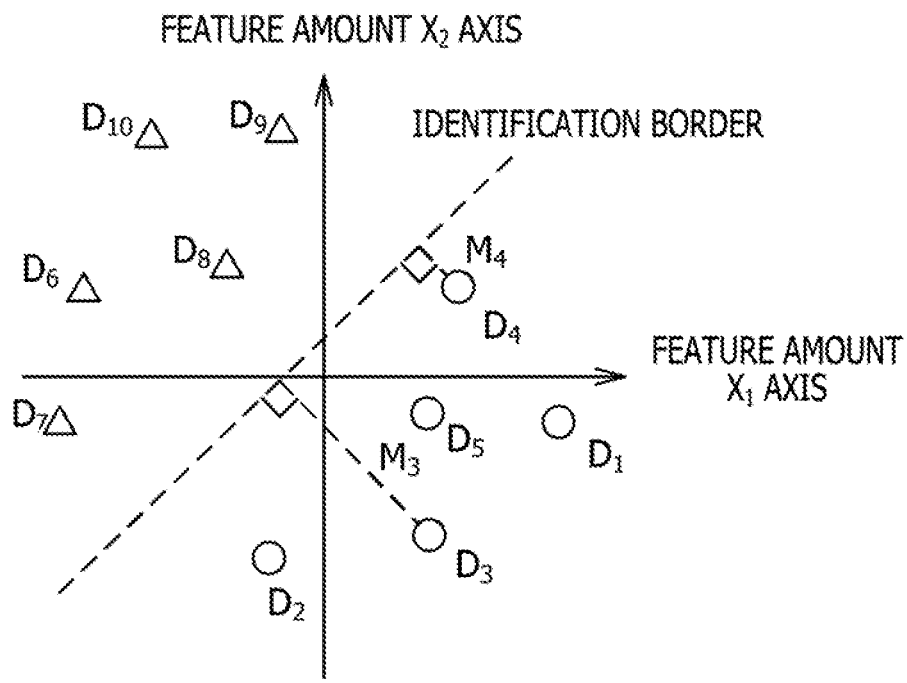

FIGS. 9A and 9B are diagrams for illustrating a process for obtaining an identification margin value (Mi) of each data. FIG. 9A illustrates third cross validation, and FIG. 9B illustrates fourth cross validation as an example. A distance indicating how far the two remaining learning images are separated relative to an identification boundary in a feature space generated by the eight learning images is obtained as the identification margin value of each learning image. By normalizing the feature space, it is possible to set the reference of the distance to ±1.

A more specific example will be described. In the learning of the genetic programming, the learning is often advanced so that the fitness is normalized in a range of 0.0 to 1.0 and the fitness increases toward 1.0. For that purpose, a method for adding the identification margin separability of the cross validation to the fitness definition equation as a penalty term is suitable. Therefore, as indicated in the equation (2) below, it is preferable to make definition so that the penalty amount decreases as the separability increases and the fitness is set to increase.

$$\text{Fitness=correct answer rate−SVM identification margin penalty} \quad (2)$$

As an index of the distance (interval) between the identification margin value distribution of the good data for learning and the identification margin value distribution of the defective data for learning, a basic statistic amount such as an average value, a maximum value, or a minimum value can be used. On the basis of the index, a plurality of definition equations is considered regarding the definition of the penalty amount about the identification margin value. A representative example is represented as the equations (3) to (5) below.

$$\text{SVM margin penalty=1.0/(average margin value on OK side−average margin value on no good side)} \quad (3)$$

$$\text{SVM margin penalty=1.0−(minimum margin value on OK side−maximum margin value on no good side)} \quad (4)$$

$$\text{SVM margin penalty=(minimum margin value on OK side−1.0)+(−1.0−maximum margin value on no good side)} \quad (5)$$

It is possible not only to continuously use the single definition during learning but also to use the plurality of definitions as switching the definitions. For example, it is effective to follow the definition in the above equation (3) at the beginning of learning and use the definition in the above equation (4) in the latter half of learning.

In a case where the above SVM margin penalty is used, a form is considered in which the definition of the fitness is different as in the equation (6) or (7) below. Note that it is possible to adjust the range of the fitness by multiplying each term by an appropriate coefficient.

$$\text{Fitness=correct answer rate−SVM identification margin penalty} \quad (6)$$

$$\text{Fitness=correct answer rate−SVM identification margin penalty−identifier penalty} \quad (7)$$

Here, the identifier penalty is a penalty term (including the number of feature dimensions, the number of support vectors, tree structure size, or the like) to suppress overlearning regarding the identifier.

FIG. 10 is a diagram illustrating a flowchart indicating the fitness calculation processing described above. As illustrated in FIG. 10, the fitness calculation unit 30 calculates the correct answer rate by executing the cross validation on the learning image (step S31). Next, the identification margin calculation unit 26 acquires the identification margin value by calculating the identification margin value of each learning image (step S32). Next, the statistic amount calculation unit 27 calculates a statistic amount of the identification margin value (step S33). Next, the penalty calculation unit 29 calculates a penalty amount on the basis of the statistic amount of the identification margin value (step S34). Next, the fitness calculation unit 30 calculates a penalty amount of the identifier (step S35). Next, the fitness calculation unit 30 calculates the fitness (step S36).

According to the present embodiment, the genetic processing is executed on at least two class classification programs selected from the set of the plurality of class classification programs. According to the class classification program on which the genetic processing has been executed, regarding the plurality of identifiers created by using one or more pieces of first class learning data (good data for learning) belonging to a first class (good) and one or more pieces of second class learning data (defective data for learning) belonging to a second class (defective), a distance between each piece of the learning data and the identification boundary is acquired. For each piece of the good data for learning and the defective data for learning, a statistic amount of the distribution of the distance to the identification boundary is calculated, and the fitness that increases as the separability between the good data for learning and the defective data for learning is larger is used on the basis of the statistic amount of the good data for learning and the statistic amount of the defective data for learning. Depending on the fitness, by determining whether or not to replace the class classification program on which the genetic processing has been executed and any one of class classification programs in the parent group, it is possible to automatically generate the class classification program with high general versatility.

FIGS. 11A to 11D are diagrams illustrating results of verification according to the present embodiment. As illustrated in FIG. 11A, a good image in which no scratch is made on a surface of a circular component and a defective image in which a scratch is generated on the surface of the circular component are used. A good product has a large number of small scratches (drawn with short line segments), and only a line segment having a length and a thickness more than a predetermined length and thickness is assumed as a defective scratch. As illustrated in FIG. 11B, learning to 400 generations is performed by using 50 individuals and 40 learning images, and a correct answer rate of the quality determination is examined by using 160 quality determination images.

The following equations (8) and (9) are used as definition equations of the fitness at the time of learning. A degree of an influence of the SVM identification margin penalty on the fitness can be adjusted by a weight applied to the penalty amount. When the weight is increased, the influence of the penalty amount is relatively increased. In the verification in FIGS. 11A to 11D, the fitness is calculated by multiplying a weighting coefficient 0.2 as the penalty amount.

$$\text{Fitness} = \text{correct answer rate} - \text{SVM identification margin penalty} \quad (8)$$

$$\text{SVM identification margin penalty} = 0.2 \times ((1.0 - OK_{min}) + (-1.0 - NG_{max})) \quad (9)$$

$OK_{min}$: minimum margin value on OK data side
$NG_{max}$: maximum margin value on no good data side FIGS. 11C and 11D illustrate a change in the fitness according to the progress of the learning generation. On the left side, a result of learning by using the fitness according to the correct answer rate without considering the SVM identification margin is indicated. On the right side, a result of learning by using the fitness definition equation using an inter-class separability of the SVM identification margin is indicated. The solid line indicates a maximum fitness, and the dotted line indicates an average fitness. It can be confirmed that the fitness steadily increases under any learning condition. Note that it is seen that numerical values in a graph on the right side are generally reduced by the identification margin penalty.

Between several generations, quality determination results on 160 quality determination images are compared with each other. An increase in the correct answer rate of about several % can be confirmed, on the right side using the fitness based on the SVM identification margin value.

Second Embodiment

In a second embodiment, a statistic amount of an identification margin value for each learning image is calculated, and a learning image having a small margin is statistically considered to be important for identification. Then, a fitness is defined so as to increase weighting of the learning image.

Figure 12:
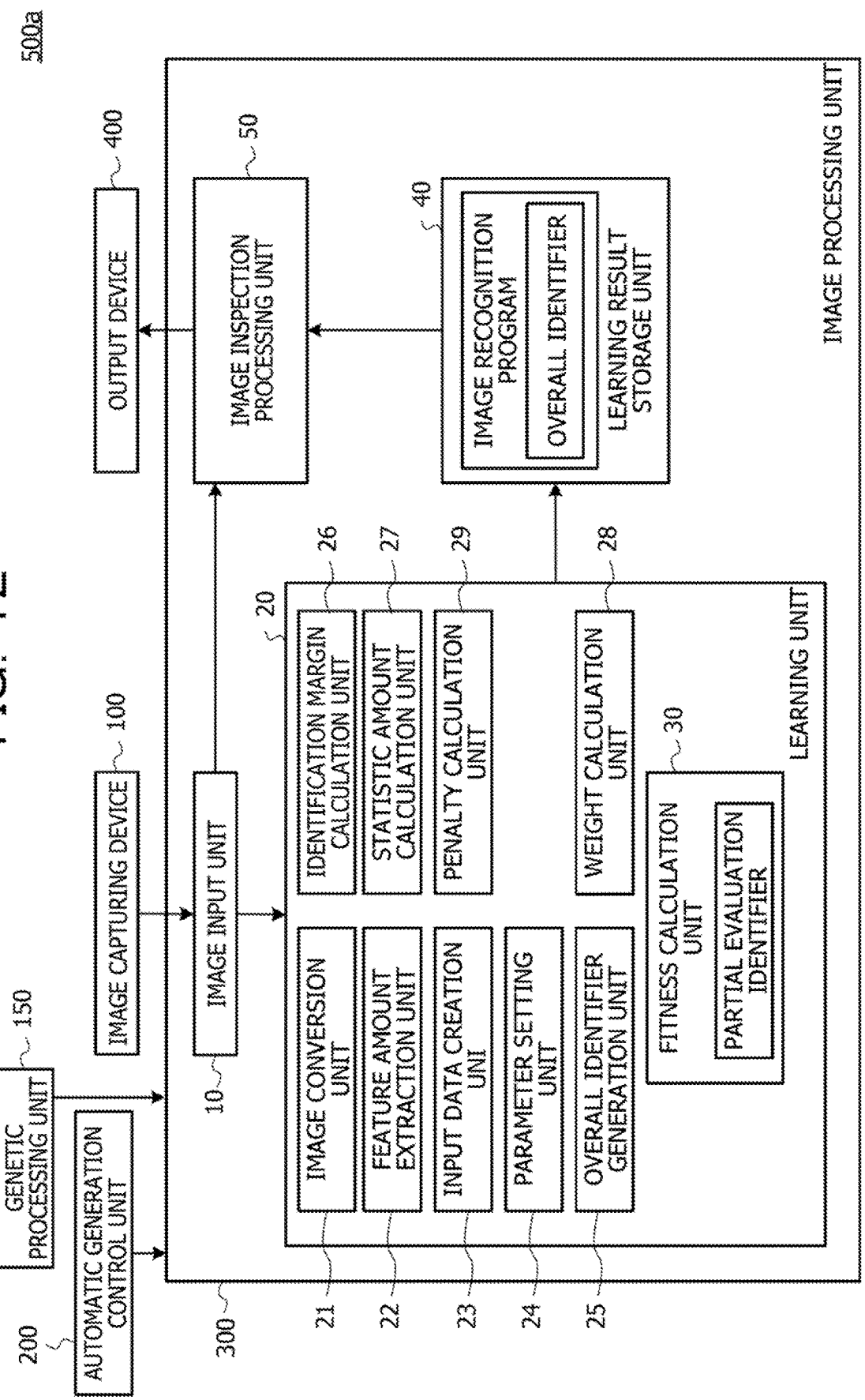
FIG. 12 is a block diagram illustrating an entire configuration of an information processing apparatus according to a second embodiment.

FIG. 12 is a block diagram illustrating an entire configuration of an information processing apparatus 500a according to the second embodiment. As illustrated in FIG. 12, the information processing apparatus 500a is different from the information processing apparatus 500 according to the embodiment in that the learning unit 20 further includes a weight calculation unit 28.

Figure 13:
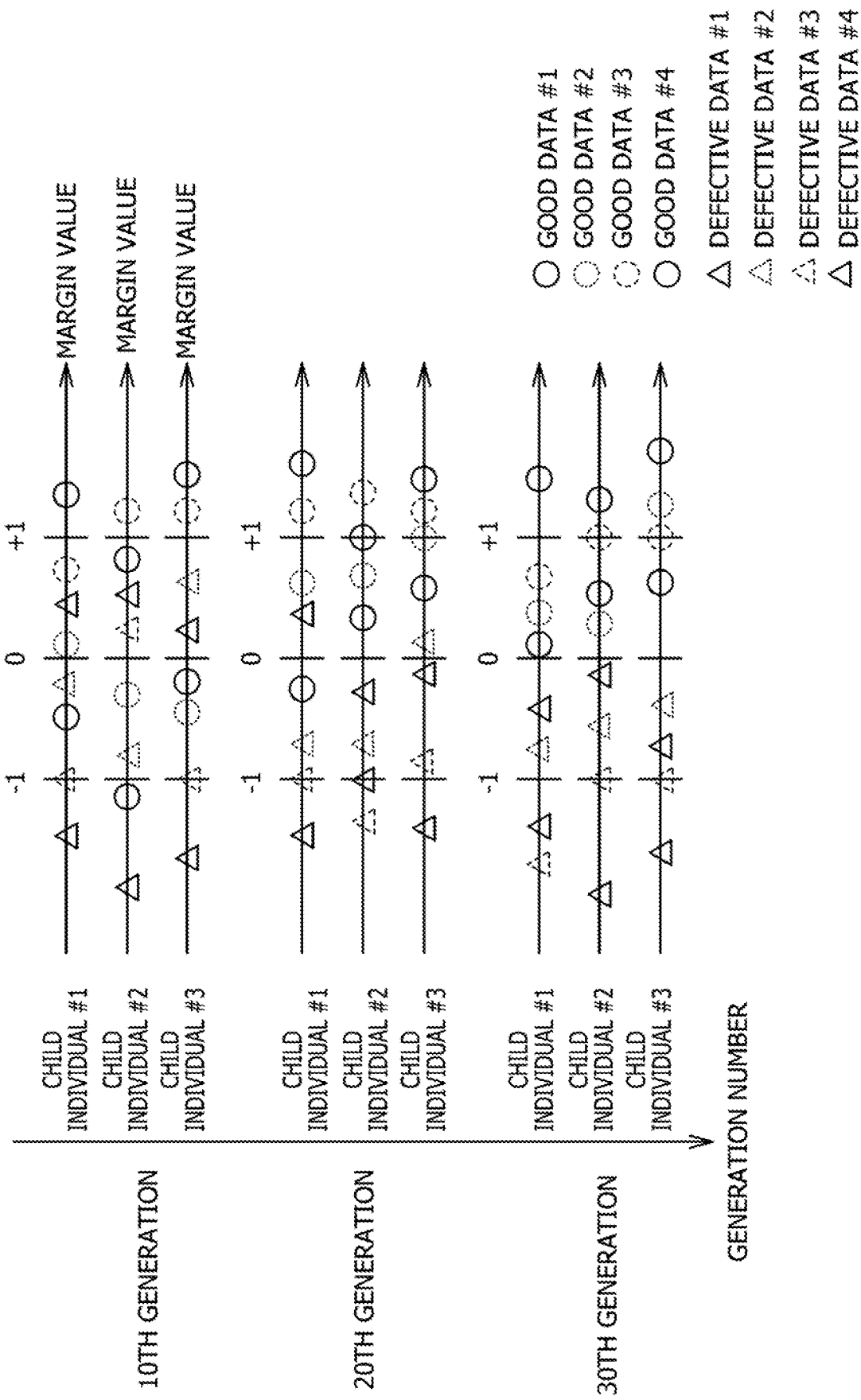
FIG. 13 is a diagram illustrating weighting.

FIG. 13 is a diagram illustrating weighting. In the example in FIG. 13, a state is illustrated in which the number of learning images is eight in total and genetic programming learning is continued while generating three child individuals in each generation. As in the first embodiment, eight identification margin values for each learning image obtained by cross validation are drawn. In FIG. 13, the respective learning images are drawn by using different patterns.

As illustrated in FIG. 13, for example, three child individuals #1 to #3 are generated in each generation. These individuals respectively have different tree-structure element filters, and each individual generates an identifier according to different image conversion, image feature extraction, and identifier generation parameters and executes cross validation. Therefore, the individuals have different identification margin values for the same learning image. However, for example, as defective data for learning #1, there is a learning image that is almost constantly positioned near an identification boundary (margin value=0) even under different conditions. On the other hand, as defective data for learning #4, there is a learning image having a margin value that is largely separated from the identification boundary. This indicates that, in a case where the image is viewed as data for image inspection, there are many cases where the defective data for learning #1 is a defective product of which the quality determination is difficult and the defective data for learning #4 is an obviously defective product.

As aimed in the first embodiment, in order to increase the separability of the identification margin values of the good data for learning and the defective data for learning, it is considered to be effective to proceed learning so that the margin value of the defective data for learning #1 which is difficult to identify is separated from the identification boundary (increase in direction of negative value). Therefore, the statistic amount of the identification margin values for each learning image is calculated over a plurality of image classification programs or a plurality of generations, a weight of data having a small average margin value (calculated as absolute value) is increased, and a distance between a distribution of the good data for learning and a distribution of the defective data for learning is obtained.

Figure 14:
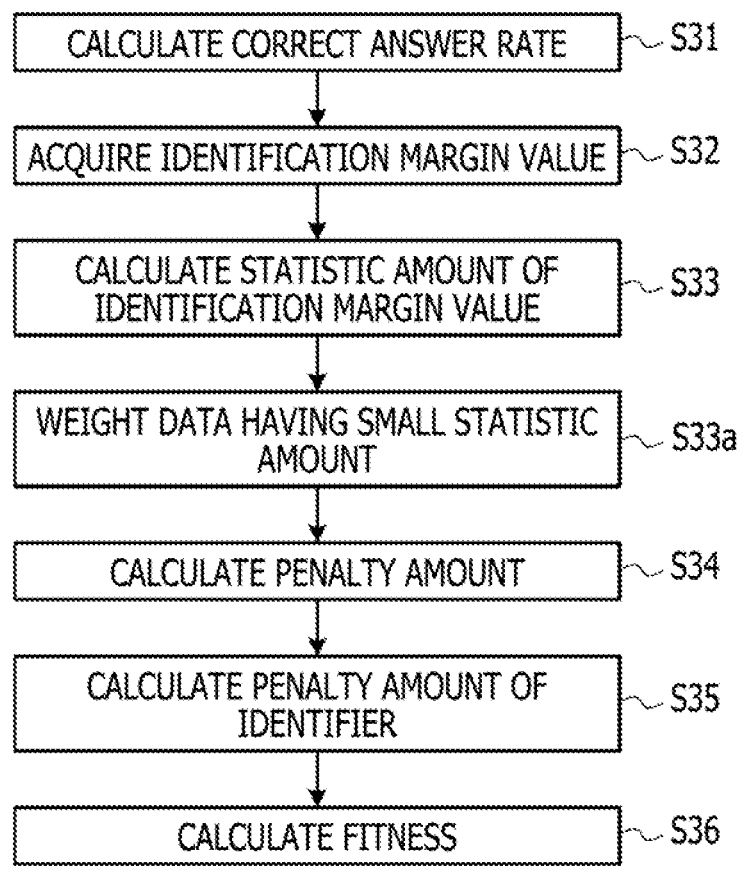
FIG. 14 is a diagram illustrating a flowchart indicating fitness calculation processing.

FIG. 14 is a diagram illustrating a flowchart indicating the fitness calculation processing described above. The flowchart in FIG. 14 is different from the flowchart in FIG. 10 in that step S33a is executed between steps S33 and S34. The weight calculation unit 28 increases a weight of data having a small statistic amount (step S33a). Thereafter, the processing subsequent to step S34 is executed.

According to the present embodiment, a weighting coefficient is calculated so that the weight increases as the learning image is closer to the identification boundary. According to this configuration, learning is proceeded so that the learning image that is difficult to identify is separated from the identification boundary. This makes it possible to generate a class classification program with higher general versatility.

Note that, in the present embodiment, the following method may be used as an example for calculating the weight of each learning image.

Identification margin penalty=weighted average of
identification margin value of each learning
image Weight=1.0/average margin of each learning image The average margin is obtained as an average value (calculate as absolute value) of the identification margin values of all the child individuals in an immediately preceding generation or a predetermined number of generations.

Another Example

In a case where the separability of the identification margin of the cross validation is large, at the same time, it is expected that the correct answer rate of the cross validation increases. Therefore, it is possible to define the fitness as in the following equation without using the correct answer rate.

Fitness=understood as cross validation identification
margin separability or penalty term, Fitness=1.0−SVM identification margin penalty Furthermore, to the above fitness definition, a penalty term regarding an identifier (the number of feature dimensions, the number of support vectors, tree structure size, or the like) can be added. Note that, when the cross validation is used, a method can be used for performing the cross validation by increasing the number of use times of data to be equal to or more than the number of learning images by repeating the cross validation a plurality of times while shuffling data as changing the data division method in the K-fold cross validation. With this method, it is possible to improve the correct answer rate and the calculation accuracy of the statistic amount of the identification margin distribution.

Note that, in each example, the two-class classification referred to as the quality determination has been described. However, multi-class classification of three or more classes may be performed. In this case, a fitness of the multi-class classification may be calculated by calculating the statistic amount of the distribution of the distance to the identification boundary for each of two classes and integrating the fitness of each of the two-class classification.

In each example above, the image has been used as the quality determination (class classification) target. However, the target is not limited to the image. Other data such as voice data may be used as the class classification target.

Figure 15:
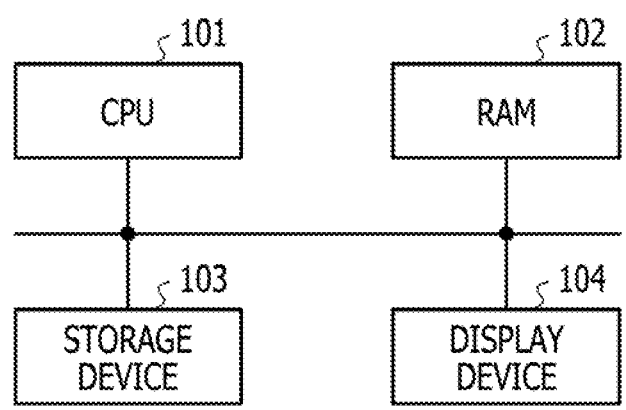
FIG. 15 is a block diagram for explaining a hardware configuration of a genetic processing unit, a replacement unit, and an image processing unit.

FIG. 15 is a block diagram for explaining a hardware configuration of the genetic processing unit 150, the automatic generation control unit 200, and the image processing unit 300. As illustrated in FIG. 15, each of the genetic processing unit 150, the automatic generation control unit 200, and the image processing unit 300 includes a CPU 101, a RAM 102, a storage device 103, or the like. The Central Processing Unit (CPU) 101 is a central processing unit.

The CPU 101 includes one or more cores. The Random Access Memory (RAM) 102 serves as a volatile memory that temporarily stores a program to be executed by the CPU 101, data to be processed by the CPU 101, and the like. The storage device 103 serves as a non-volatile storage device. For example, as the storage device 103, a Read Only Memory (ROM), a solid state drive (SSD) such as a flash memory, or a hard disk driven by a hard disk drive can be used. The storage device 103 stores an information processing program. Note that, in the present embodiment, each unit of the genetic processing unit 150, the automatic generation control unit 200, and the image processing unit 300 is realized by executing the program. However, hardware such as a dedicated circuit may be used.

In each example described above, the genetic processing unit 150 is an example of a genetic processing unit that executes genetic processing on at least two class classification programs selected from a set of a plurality of class classification programs. The identification margin calculation unit 26 is an example of a distance acquisition unit that acquires a distance between each piece of learning data and an identification boundary regarding a plurality of identifiers created by using one or more pieces of first class learning data belonging to a first class and one or more pieces of second class learning data belonging to a second class according to the class classification program on which the genetic processing has been executed. The statistic amount calculation unit 27 is an example of a statistic amount calculation unit that calculates a statistic amount of a distribution of the distance to the identification boundary for each of the first class learning data and the second class learning data. The fitness calculation unit 30 is an example of a fitness calculation unit that defines a fitness calculation equation in which a fitness is larger as separability between the first class and the second class increases on the basis of the statistic amount of the first class learning data and the statistic amount of the second class learning data and calculates the fitness of the class classification program on which the genetic processing has been executed. The automatic generation control unit 200 is an example of a determination unit that determines whether or not to replace the class classification program on which the genetic processing has been executed with any one of class classification programs of the set depending on the fitness. The weight calculation unit 28 is an example of a coefficient calculation unit that calculates a weighting coefficient of each piece of learning data. The image conversion unit 21 is an example of an image conversion unit that executes image conversion processing on the image data according to the class classification program. The feature amount extraction unit 22 is an example of a feature amount extraction unit that extracts a feature amount from the image data on which the image conversion processing has been executed by the image conversion unit. The overall identifier generation unit 25 is an example of an overall identifier generation unit that generates the evaluation identifier on the basis of the feature amount.

The embodiments have been described in detail. However, the present invention is not limited to such a specific embodiment, and various modifications and alterations can be made within the scope of gist of the present invention described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
execute genetic processing on at least two class classification programs selected from a set of a plurality of class classification programs;
acquire a distance between each piece of learning data and an identification boundary regarding a plurality of evaluation identifiers created by using one or more pieces of first class learning data belonging to a first class and one or more pieces of second class learning data belonging to a second class according to the class classification program on which the genetic processing has been executed;
calculate a statistic amount of a distribution of a distance to the identification boundary for each of the first class learning data and the second class learning data;
define a fitness calculation equation in which a fitness is larger as separability between the first class and the second class increases on a basis of the statistic amount of the first class learning data and the statistic amount of the second class learning data;
calculate the fitness of the class classification program on which the genetic processing has been executed; and
determine whether or not to replace the class classification program on which the genetic processing has been executed with any one of class classification programs of the set depending on the fitness.

2. The information processing apparatus according to claim 1, wherein
the processor is configured to use a plurality of partial evaluation identifiers created by performing cross validation on each learning data, as the plurality of evaluation identifiers.

3. The information processing apparatus according to claim 1, wherein the processor is configured to:
calculate a weighting coefficient for each piece of the learning data; and
calculate the fitness by using the weighting coefficient.

4. The information processing apparatus according to claim 3, wherein the processor is configured to apply a heavier weight to learning data closer to the identification boundary.

5. The information processing apparatus according to claim 1, wherein
the learning data is image data, and
the processor is configured to:
execute image conversion processing on the image data according to a class classification program;
extract a feature amount from the image data on which the image conversion processing has been executed; and
generate the evaluation identifier on a basis of the feature amount.

6. The information processing apparatus according to claim 1, wherein
a normalized identification margin obtained by a Support Vector Machine is used as the distance between the learning data and the identification boundary.

7. The information processing apparatus according to claim 1, wherein
to the fitness, a correct answer rate for the learning data and an evaluation value of the separability between the first class and the second class are reflected.

8. The information processing apparatus according to claim 7, wherein
the evaluation value of the separability is cross validation identification margin separability.

9. The information processing apparatus according to claim 8, wherein
as the cross validation identification margin separability, a difference between an average margin value of the first class and an average margin value of the second class or a difference between a minimum margin value of the first class and a minimum margin value of the second class is used.

10. An information processing method comprising:
executing, by a computer, genetic processing on at least two class classification programs selected from a set of a plurality of class classification programs;
acquiring a distance between each piece of learning data and an identification boundary, regarding a plurality of evaluation identifiers created by using one or more pieces of first class learning data belonging to a first class and one or more pieces of second class learning data belonging to a second class according to the class classification program on which the genetic processing has been executed;
calculating a statistic amount of a distribution of a distance to the identification boundary for each of the first class learning data and the second class learning data;
defining a fitness calculation equation in which a fitness is larger as separability between the first class and the second class increases on a basis of the statistic amount of the first class learning data and the statistic amount of the second class learning data and calculating the fitness of the class classification program on which the genetic processing has been executed; and
determining whether or not to replace the class classification program on which the genetic processing has been executed with any one of class classification programs of the set depending on the fitness.

11. A non-transitory computer-readable recording medium having stored therein an information processing program for causing a computer to execute processing comprising:

executing genetic processing on at least two class classification programs selected from a set of a plurality of class classification programs;

acquiring a distance between each piece of learning data and an identification boundary regarding a plurality of evaluation identifiers created by using one or more pieces of first class learning data belonging to a first class and one or more pieces of second class learning data belonging to a second class according to the class classification program on which the genetic processing has been executed;

calculating a statistic amount of a distribution of a distance to the identification boundary for each of the first class learning data and the second class learning data;

defining a fitness calculation equation in which a fitness is larger as separability between the first class and the second class increases on a basis of the statistic amount of the first class learning data and the statistic amount of the second class learning data and calculating the fitness of the class classification program on which the genetic processing has been executed; and determining whether or not to replace the class classification program on which the genetic processing has been executed with any one of class classification programs of the set depending on the fitness.

* * * * *